Nov. 4, 1924.
A. SHEFFIELD, JR
1,514,306
ENGINE CONNECTING ROD
Filed June 1, 1921
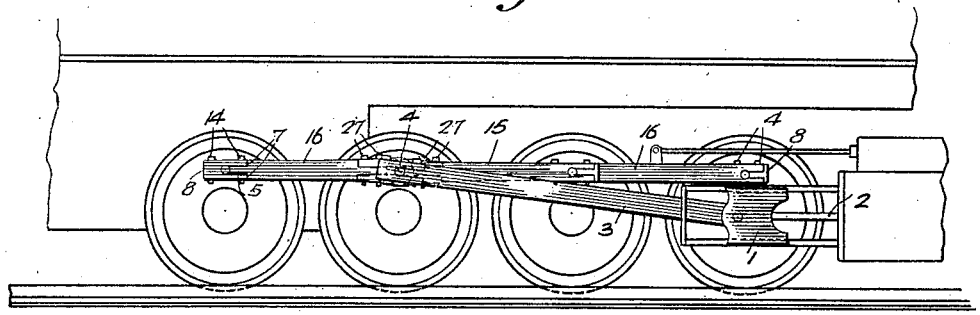
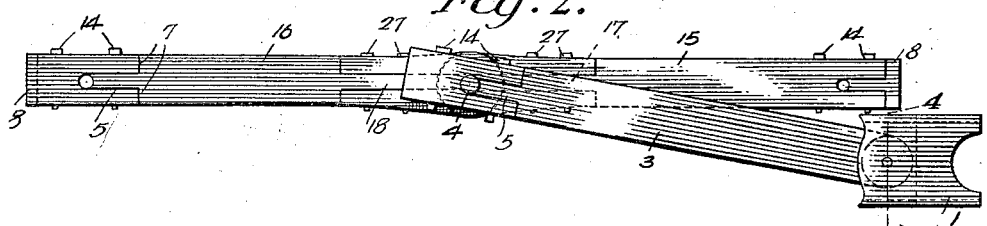
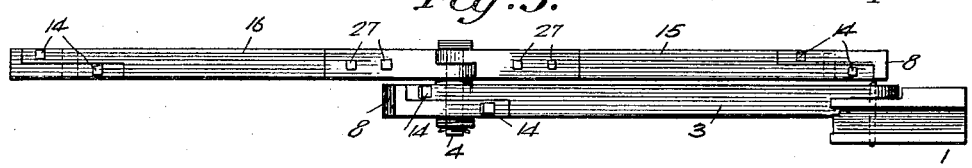
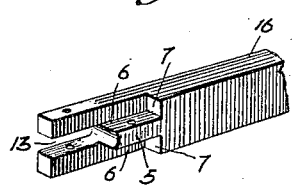
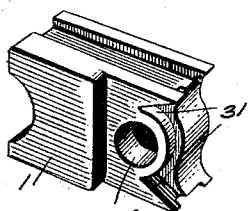
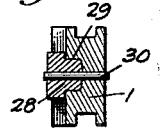
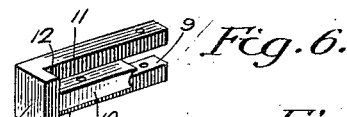
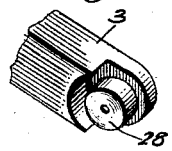
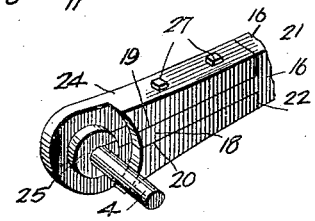
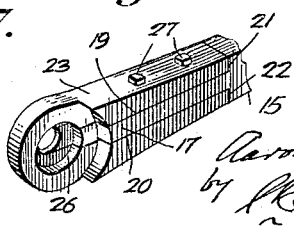
Inventor:
Aaron Sheffield Jr.
by R. E. Anderson
Attorney.

Patented Nov. 4, 1924.

1,514,306

UNITED STATES PATENT OFFICE.

AARON SHEFFIELD, JR., OF PHILADELPHIA, PENNSYLVANIA.

ENGINE CONNECTING ROD.

Application filed June 1, 1921. Serial No. 474,232.

*To all whom it may concern:*

Be it known that I, AARON SHEFFIELD, Jr., a citizen of the United States, residing at Philadelphia, in the county of Philadelphia and State of Pennsylvania, have invented certain new and useful Improvements in Engine Connecting Rods; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to connecting rods or driving arms of locomotives and other engines. It has for its object to construct the ends of the connecting rods which are attached to the wrist pins of the driving wheels or other driven parts so as to afford greater security of attachment and avoid the liability of loosening or separation of the parts as sometimes happens in the employment of wedges and straps for connecting the ends of the rods to the wrist pin or driving shaft as at present commonly practiced.

For the accomplishment of the foregoing and such other objects as may hereinafter appear the invention consists in the features hereinafter particularly described and then sought to be clearly defined by the claims, reference being had to the accompanying drawing forming a part hereof, and in which—

Figure 1 is a side view showing the invention applied to a locomotive;

Figure 2 is a side view of the connecting rod;

Figure 3 is a plan view of the same;

Figure 4 is a cross section on line 4—4 of Fig. 2;

Figures 5, 6, 7, 8, 9 and 10 are detail views, in perspective, of various parts.

In the drawing the numeral 1 designates the cross head or sliding block commonly employed for coupling the piston rod 2 to the connecting rod 3 which transmits motion through the wrist pin 4 of a locomotive drive wheel or shaft to be driven by the piston. The connection between the connecting rod and shaft or wrist-pin is made by forming the end of the rod with a cap which with the main body portion of the rod will receive the wrist or crank pin so that the same will be securely held without liability of the parts becoming separated or loosened, the rod and the cap being formed so that one member will have a tongue, above and below which will be recesses, and having shoulders at its base. The other member will be formed with a corresponding opening or slot to receive the tongue, the upper and lower members of the slotted member lying in the recesses above and below the tongue and their ends abutting against the shoulders at the base of the tongue, bolts or pins being used to fasten the cap to the end of the rod. In one form of the invention the rod is formed with a tongue 5 above and below which are recesses 6, and at its base are shoulders 7. The cap, designated by the numeral 8, is formed with an opening or slot 9 which receives the tongue 5 of the rod, the upper and lower members which form the boundaries of the slot in the cap lying in the recesses 6 and abutting against the shoulders 7 at the base of the tongue 5. In this form it is preferred to form the cap 8 with a tongue 10 above and below which are recesses 11 and at the base thereof shoulders 12, the tongue being adapted to fit in a slot 13 of the rod so that members above and below the slot will fit in the recesses 11 and abut against the shoulders 12. The cap 8 will be secured to the end of the connecting rod by pins or threaded bolts 14 as illustrated. A connecting rod formed as described may be used for either a stationary engine or a locomotive. If used for a locomotive the additional connecting rods 15 and 16 will be formed at one end as described for the connecting rod leading from the piston rod slide block, and the end of each of the rods 15 and 16 where they connect with the wrist pin 4 are preferably formed as follows. The rods will be formed respectively with tongues 17 and 18 with recesses 19 and 20 above and below the tongues and with shoulders 21 and 22 at the base of the tongues. Caps 23 and 24 are provided for the two tongues, respectively, one cap being formed with a boss 25 and the other with a socket 26 to receive the boss so as to form a boss and socket joint connection or coupling, the meeting edges of the two rods being rounded so as to provide for one turning freely in relation to the other. The caps 23 and 24 are each slotted so as to receive the tongues 17 and 18, respectively, the upper and lower members forming the boundary of each slot fitting in the recesses of its companion tongue and abutting against the shoulders at the base of the tongues. The caps will be secured to their respective rods by bolts or pins 27.

The connecting rod 3 at the end next to the cross head or slide block 1 is formed with a boss 28 which fits in a socket or cavity 29 formed in the head block and secured by a bolt or pin 30 so as to pivot thereon, and the side face of the head-block is cut away as shown at 31 at a proper angle to permit the required vertical throw or swing of the connecting rod at that point.

It will be observed that in the different forms of the invention, the connecting rod has a tongue at its end, above and below which is a recess and a shoulder at the base, so that the upper and lower members of a cap will fit in said recesses and the ends will abut against the shoulders at the base of the tongue. It will also be observed that in both forms the cap for the end of the rod has a side projection, in one form a boss and in the other a tongue, adapted to fit in an opening in a companion member, in one case the recess in the side of the companion or coupled rod, and in the other the recess or slot in the end of the connecting rod, said projection in both cases tending to strengthen the connection between the parts thus joined together.

The construction specified dispenses with the necessity of separate wedge blocks to effect the connection between the connecting rod and crank or wrist pin; and yet will permit the use of brasses between the wrist-pin and enclosing end of the connecting rod if desired. There are no parts liable to become loose or separated or to need any frequent tightening-up.

Changes can be made in details of some of the parts and the essential features of the invention be retained.

Having described the invention and set forth its merits, what I claim is:

1. An engine connecting rod formed at its end with a tongue above and below which is a recess and a shoulder at the base thereof, and a cap formed with upper and lower members fitting in the recesses above and below the tongue and abutting the shoulders at the base of the tongue, the tongue fitting between the two members of the cap.

2. An engine connecting rod formed with a tongue at its end, and with parallel members extending beyond the end of the tongue, and a cap provided with a tongue to fit between the parallel extending members of the rod and with parallel extending members to fit above and below the tongue of the rod.

3. An engine connecting rod and a companion associated member, the connecting rod having a recess formed in its side at one end and a circular projection formed on the inside face of the reduced end, and the companion member having a recess formed in its side at one end and a socket formed in the reduced end to receive the circular projection of the connecting rod, the reduced ends of the two members lapping each other, and a pin passing through the connecting rod and its side circular projection and the associated member to secure one to the other.

In testimony whereof I affix my signature in presence of two witnesses.

AARON SHEFFIELD, Jr.

Witnesses:
CHARLES H. CLARK,
JENNIE CLARK.